United States Patent
Hugues

(10) Patent No.: US 12,420,460 B2
(45) Date of Patent: Sep. 23, 2025

(54) FOAM PART, IN PARTICULAR FOR A VEHICLE SEAT, METHOD FOR PRODUCING A FOAM PART, AND VEHICLE SEAT

(71) Applicant: ADIENT US LLC, Plymouth, MI (US)

(72) Inventor: Laurent Hugues, Soultz les Bain (FR)

(73) Assignee: Adient US LLC, Plymouth, MI (US)

( * ) Notice: Subject to any disclaimer, the term of this patent is extended or adjusted under 35 U.S.C. 154(b) by 273 days.

(21) Appl. No.: 18/044,240

(22) PCT Filed: Sep. 29, 2021

(86) PCT No.: PCT/EP2021/076723
§ 371 (c)(1),
(2) Date: Mar. 7, 2023

(87) PCT Pub. No.: WO2022/069504
PCT Pub. Date: Apr. 7, 2022

(65) Prior Publication Data
US 2023/0347556 A1    Nov. 2, 2023

(30) Foreign Application Priority Data

Sep. 29, 2020 (DE) .................. 10 2020 125 382.6
Feb. 1, 2021 (DE) .................. 10 2021 102 229.0

(51) Int. Cl.
*B29C 44/12* (2006.01)
*B60N 2/70* (2006.01)
(Continued)

(52) U.S. Cl.
CPC ........ *B29C 44/1266* (2013.01); *B60N 2/7017* (2013.01); *B29K 2075/00* (2013.01);
(Continued)

(58) Field of Classification Search
CPC .............. B60N 2/7017; B29K 2075/00; B29K 2995/0097; B29K 2623/12; B29L 2031/58
(Continued)

(56) References Cited

U.S. PATENT DOCUMENTS 6,672,671 B1 * 1/2004 Stoschek ............. B29C 44/1276
297/452.48
11,702,208 B2 * 7/2023 Madrigal ........... B64D 11/0619
297/452.48
(Continued)

FOREIGN PATENT DOCUMENTS

DE      102016213791 A1    11/2017
JP      2011143746 A        7/2011
(Continued)

OTHER PUBLICATIONS

PCT International Search Report and Written Opinion (PCT/EP2021/076723).

*Primary Examiner* — Jose V Chen
(74) *Attorney, Agent, or Firm* — Marshall & Melhorn, LLC

(57) ABSTRACT

A foam part for a vehicle seat having a textile layer and a foam body made from a polyurethane foam. The textile layer may be designed as a three-dimensionally formed non-woven layer. The non-woven layer may have a grammage of 800 to 1200 grams per square meter. A method for producing the foam part and for providing the vehicle seat having at least one foam part are described.

20 Claims, 4 Drawing Sheets

(51) Int. Cl.
     *B29K 75/00*     (2006.01)
     *B29K 105/08*    (2006.01)
     *B29K 623/00*    (2006.01)
     *B29K 667/00*    (2006.01)
     *B29L 31/58*     (2006.01)

(52) U.S. Cl.
     CPC .. *B29K 2105/0854* (2013.01); *B29K 2623/12* (2013.01); *B29K 2667/00* (2013.01); *B29K 2995/0097* (2013.01); *B29L 2031/58* (2013.01)

(58) Field of Classification Search
     USPC .................................................. 297/452.48
     See application file for complete search history.

(56) References Cited

U.S. PATENT DOCUMENTS

| | | | | |
|---|---|---|---|---|
| 11,926,137 | B2 * | 3/2024 | Begg | B32B 27/08 |
| 2005/0238842 | A1 * | 10/2005 | Schindzielorz | B60N 2/70 |
| | | | | 428/102 |
| 2012/0181841 | A1 * | 7/2012 | Petzel | A47C 7/02 |
| | | | | 297/452.48 |
| 2013/0127225 | A1 | 5/2013 | Kono et al. | |
| 2013/0300178 | A1 | 11/2013 | Murata et al. | |
| 2014/0035342 | A1 * | 2/2014 | Scholz | B60N 2/58 |
| | | | | 442/247 |
| 2016/0167260 | A1 * | 6/2016 | Thomas | B32B 27/32 |
| | | | | 428/304.4 |
| 2016/0167552 | A1 * | 6/2016 | Rigal | B60N 2/5891 |
| | | | | 425/395 |
| 2016/0361894 | A1 * | 12/2016 | Ciuperca | E04B 1/80 |
| 2017/0028887 | A1 * | 2/2017 | Schulze | B60N 2/5875 |
| 2017/0232686 | A1 * | 8/2017 | Könczöl | D04H 1/558 |
| | | | | 156/242 |
| 2018/0072207 | A1 * | 3/2018 | Mauffrey | B29D 99/0092 |
| 2021/0347132 | A1 * | 11/2021 | Engel | B29C 70/086 |
| 2022/0098770 | A1 * | 3/2022 | Jafari | B32B 5/022 |
| 2023/0023502 | A1 * | 1/2023 | Ben Lagha | G01L 1/205 |

FOREIGN PATENT DOCUMENTS

| | | |
|---|---|---|
| WO | 2009036841 A1 | 3/2009 |
| WO | 2014106592 A1 | 7/2014 |
| WO | 2017191263 A1 | 11/2017 |
| WO | 2018229185 A1 | 12/2018 |
| WO | 2020030725 A1 | 2/2020 |

* cited by examiner

FOAM PART, IN PARTICULAR FOR A VEHICLE SEAT, METHOD FOR PRODUCING A FOAM PART, AND VEHICLE SEAT

FIELD

The invention relates to a foam part, in particular for a vehicle seat, having a textile layer and a foam body, in particular made from a polyurethane foam, wherein the textile layer is embodied as a three-dimensionally shaped nonwoven layer. The invention furthermore relates to a method for producing a foam part, and to a vehicle seat.

BACKGROUND

There is a known practice of using foam parts for vehicle seats which serve to cushion a seat structure and are intended to offer a user of the vehicle seat the best possible seating comfort.

WO 2009/036841 A1 discloses a backrest for a vehicle seat in a motor vehicle, wherein the backrest is formed from a one-piece or multi-piece, padded wire frame. The wire frame gives a foam body of the foam part the necessary stiffness.

WO 2014/106592 A1 discloses a foam part, in particular for a vehicle seat, having a first foam layer facing a user and a second foam layer facing away from the user, wherein the first foam layer has a different hardness and/or density than the second foam layer, wherein the first foam layer has a plurality of comfort tubes facing the user. The first foam layer can be separated from the second foam layer by a mesh structure, in particular made of polyethylene, jute, gauze or nonwoven.

There is a known practice in the prior art of providing foam parts for upholstery parts made of polyurethane foams with a reinforcement on their underside, which is supported on a bearing frame or supporting frame of the object to be upholstered when the upholstery part is used. Such a reinforcement must, in particular, be wear-resistant and tear-resistant in order to prevent damage to or destruction of the foam part, as can occur due to the use of the upholstery part and to the associated repeated stresses and movements on the bearing frame or supporting frame.

WO 2020/030725 A1 discloses a foam part for a vehicle seat, having a textile layer and a foam body which at least partially receives the textile layer and is made of a foam material, in particular a polyurethane foam, wherein the textile layer is incompletely penetrated by the foam material and the textile layer has liquid-repellent, in particular hydrophobic, properties. The textile layer can be a nonwoven layer.

PU foam parts known from the prior art, in particular for backrests or seating parts, are not rigid enough to be implemented on their own in a seat environment. Therefore, additional support by a load-bearing seat structure is always required. Such a seat structure can be made of metal or of plastic. Therefore, vehicle seats known from the prior art consist of a seat structure and a foam part carried by the seat structure. The seat structure usually has a very high weight, is expensive and takes up installation space, but this is often scarce. Foam parts ensure comfort. The structural parts of the seat ensure the necessary structural support of the foam parts.

Overmolding a frame or a reinforcing material with foam to increase rigidity is also known in practice. However, such foam-overmolded components either cause problems with the production process or are difficult or cost-intensive.

SUMMARY

The underlying object of the invention is that of improving a foam part of the type mentioned at the outset, in particular of simplifying or even completely avoiding a seat structure carrying the foam part. This is intended to provide the possibility of constructing a vehicle seat which is lighter and more comfortable than the prior art and which, moreover, requires less installation space. In particular, it is an object to replace a wire frame for a foam part, which, although it increases the rigidity of the foam part, is heavy and cost-intensive.

It is also the underlying object of the invention to make available a method for producing a foam part according to the invention and a lightweight and low-cost vehicle seat having a foam part according to the invention.

According to the invention, this object is achieved by a foam part, in particular for a vehicle seat, having a textile layer and a foam body, in particular made from a polyurethane foam, wherein the textile layer is embodied as a three-dimensionally shaped nonwoven layer, wherein the nonwoven layer has a gram mage of from 800 to 1200 grams per square meter.

The fact that the nonwoven layer has a gram mage of from 800 to 1200 grams per square meter provides the possibility of making the foam part a load-bearing part and of simplifying or even dispensing with a seat structure that carries the foam part. The three-dimensional shape of the nonwoven layer increases its stiffness. A foam part according to the invention with a three-dimensional nonwoven layer can have a very high stiffness and yet be very comfortable. Since the nonwoven layer is very stiff on account of the selected grammage, good comfort can be achieved even with a small foam thickness of the foam body. Compared with the prior art, it is thereby possible to achieve small thicknesses of the foam part without the foam being too brittle or prone to tearing.

The nonwoven layer can be thermoformed. The nonwoven layer can be overmolded with foam. The nonwoven layer can be partially penetrated by foam material of the foam body. The nonwoven layer can be completely penetrated by foam material of the foam body.

The nonwoven layer can comprise polyester fibers. The nonwoven layer can consist of polyester fibers. The nonwoven layer can comprise polypropylene fibers. The nonwoven layer can consist of polypropylene fibers. The nonwoven layer can comprise polyester fibers and polypropylene fibers. The nonwoven layer can consist of polyester fibers and polypropylene fibers.

The nonwoven layer can have a layer thickness of from 0.7 millimeters to 5 millimeters, that is to say a layer thickness of at least 0.7 millimeters but at most 5 millimeters. The nonwoven layer preferably has a layer thickness of from 1.3 millimeters to 3.3 millimeters, in particular of from 1.5 millimeters to 2.5 millimeters. Most preferably, the nonwoven layer has a layer thickness of from 2.3 millimeters to 2.5 millimeters.

The nonwoven layer preferably has a grammage of from 850 grams per square meter to 950 grams per square meter, that is to say the grammage is at least 850 grams per square meter and at most 950 grams per square meter. Most preferably, the nonwoven layer has a grammage of 900 grams per square meter.

The nonwoven layer preferably has a modulus of elasticity of from 300 megapascals to 1000 megapascals. Most preferably, the nonwoven layer has a modulus of elasticity of from 381 megapascals to 850 megapascals.

The flexibility of the nonwoven layer is preferably between minus 1 millimeter and minus 0.1 millimeter, measured according to Nissan standard M0086.

The tensile strength of the nonwoven layer is preferably 8 megapascals to 20 megapascals, most preferably 10 megapascals to 12 megapascals, in particular 11 megapascals. The high tensile strength of the nonwoven layer makes it possible to attach external components made of plastic or composite material or metal. Further functions and components of the vehicle seat can be integrated into the nonwoven layer, for example spacers, under-cushioning mat fixings, massage mats, cable snap-in connections, trim channels and/or ventilation fixings. In the case of foam parts known from the prior art, direct fastening of external components is not possible owing to the risk that they will be torn out.

The pull-out force of the nonwoven layer is preferably greater than 200 newtons. The nonwoven layer preferably has a Poisson number of from 0.3 to 0.5, most preferably 0.4. The elongation at break of the nonwoven layer is preferably 30% to 40%, most preferably 35%. The Shore hardness is preferably greater than 50 Shore A. The Shore hardness is preferably 70 Shore A to 90 Shore A, most preferably 80 Shore A.

The nonwoven layer can be stiffened by ribs. Five ribs are preferably arranged over a length of 40 centimeters. Each rib is preferably 2 centimeters to 3 centimeters wide. The ribs can be acute-angled. The ribs can be aligned vertically. The depth of the ribs preferably corresponds approximately to the depth of the foam body. The number and shape of the ribs can vary depending on the expected sensation of stiffness, the seat structure of the vehicle seat and the customer's wishes.

The three-dimensionally shaped nonwoven layer is preferably overmolded with a foam body, in particular polyurethane foam of high durability. The foam body can have a material thickness of from 5 millimeters to 60 millimeters. A nonwoven layer/foam ratio can be higher in the case of a foam part according to the invention than in the case of foam parts known from the prior art. Therefore, a recycled fraction can reach a higher value, in particular of up to 80%.

In addition, the object is achieved according to the invention by a method for producing a foam part according to the invention, having at least the following three method steps:
inserting at least one three-dimensionally shaped nonwoven layer into a foaming tool, wherein the nonwoven layer has at least one previously described feature,
feeding the foamable material into the foaming tool, and
removing the foam part from the foaming tool.

The nonwoven layer can be formed from a largely flat nonwoven layer into a three-dimensionally shaped nonwoven layer before being inserted into the foaming tool. Forming can be accomplished by a deep-drawing process.

The object is also achieved according to the invention by a vehicle seat having at least one foam part according to the invention, in particular produced by a method according to the invention. The vehicle seat can have a seating part. The vehicle seat can have a backrest. The backrests can be secured on the seating part. The backrests can be secured on the seating part in a pivotable manner, in particular by at least one fitting.

The fact that the vehicle seat has a foam part according to the invention enables an airbag system of the vehicle seat to be secured on at least one nonwoven layer. The nonwoven layer has a sufficiently high stiffness.

The seating part can have at least one load-bearing seat structure, which carries at least one foam part according to the invention or supports a section or sections thereof. The backrest can have at least one load-bearing seat structure, which carries at least one foam part according to the invention or supports a section or sections thereof.

In summary, and in other words, the invention provides a highly rigid and thin foam cushion by overmolding a highly rigid, thermoformed nonwoven with foam. The nonwoven composition typically contains polyester fibers. It may also contain polypropylene. A preferred nonwoven thickness is 2 millimeters, but it can vary between 0.7 millimeters and 5 millimeters. A preferred (relative) density is 900 g/m$^2$, but may vary between 400 and 1800 g/m$^2$.

The use of a highly rigid thermoformed nonwoven is preferred. The highly rigid nonwoven can be overmolded with polyurethane foam. The foam may or may not penetrate into the nonwoven. The stiffness of thermoformed nonwoven can be adjusted by varying parameters of the deep-drawing process, the geometry of the nonwoven or the nonwoven material. The nonwoven material can be a nonwoven polyester or some other polymer. The nonwoven material can contain additives which may change the mechanical properties of the thermoformed nonwoven.

BRIEF DESCRIPTION OF THE FIGURES

The invention is explained in greater detail below with reference to advantageous exemplary embodiments illustrated in the figures. However, the invention is not restricted to these exemplary embodiments. The figures are schematic

DETAILED DESCRIPTION

Figure 1:
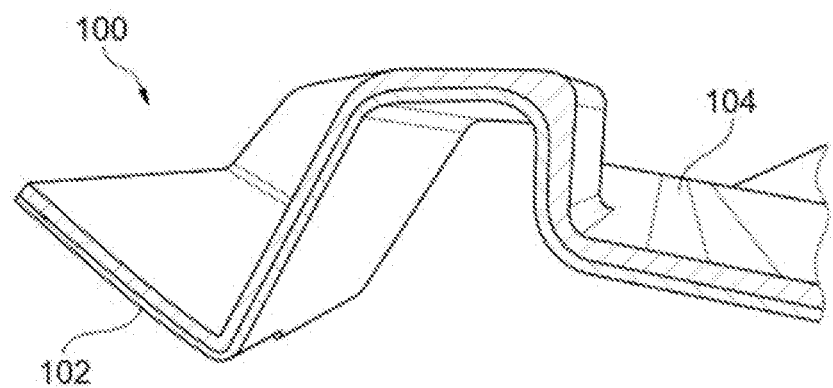
FIG. 1: shows a section through a foam part according to the invention in accordance with a first exemplary embodiment.

FIG. 1 illustrates a foam part 100 according to the invention for a vehicle seat in accordance with a first exemplary embodiment. The foam part 100 has a three-dimensionally shaped nonwoven layer 102 and a foam body 104. The foam body 104 is foamed from a foam material, in particular polyurethane foam. The foam part 100 is three-dimensionally shaped. The nonwoven layer 102 is three-dimensionally shaped. The foam body 104 is three-dimensionally shaped.

On an underside of the foam part 100 facing away from an occupant of the vehicle seat, the foam part has the preferably thermoformed nonwoven layer 102 for reinforcing, in particular stiffening, the foam part 100. In a state in which it is mounted in the vehicle seat, the nonwoven layer 102 is supported, preferably not completely, on a load-bearing seat structure, in particular a bearing frame or supporting frame of the vehicle seat.

In the present case, the nonwoven layer 102 is covered on only one side by the foam body 104. The nonwoven layer 102 is joined to the foam body 104 to form the foam part 100. The nonwoven layer 102 can be partially or completely penetrated by foam material of the foam body 104.

Figure 2:
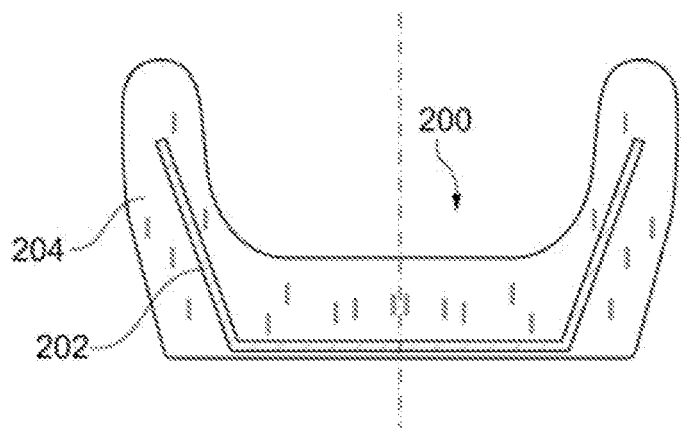
FIG. 2: shows a section through a foam part according to the invention in accordance with a second exemplary embodiment.

FIG. 2 shows, in schematic and highly abstracted form, a section through a foam part 200 according to the invention for a vehicle seat in accordance with a second exemplary embodiment. The foam part 200 has a three-dimensionally shaped nonwoven layer 202 and a foam body 204. The foam part 200 is three-dimensionally shaped. The foam body 204 is foamed from a foam material, in particular polyurethane foam. The nonwoven layer 202 is three-dimensionally shaped. The foam body 204 is three-dimensionally shaped. The nonwoven layer 202 can be partially or completely penetrated by foam material of the foam body 204. In the present case, the foam part 200 serves as a seat cushion for a seating part of a vehicle seat according to the invention.

On an underside facing away from an occupant of the vehicle seat, which, when the foam part 200 is in use, is preferably not completely supported on a bearing frame or supporting frame of the vehicle seat, the foam part 200 has the preferably thermoformed nonwoven layer 202 for reinforcing the foam part 200. In the present case, the nonwoven layer 202 is covered on both sides by the foam body 204. The nonwoven layer 202 is joined to the foam body 204 to form the foam part 200. The nonwoven layer 202 can be partially or completely penetrated by foam material of the foam body 204.

Figure 3:
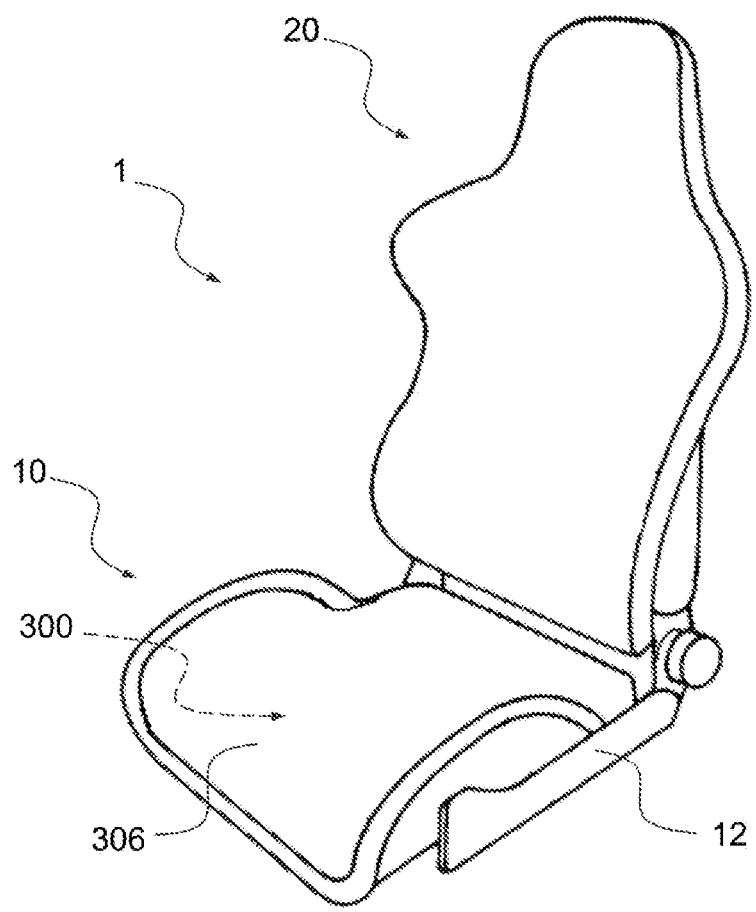
FIG. 3: shows a vehicle seat according to the invention having at least one foam part according to the invention in accordance with a third exemplary embodiment.

FIG. 3 shows a vehicle seat 1 according to the invention, having a seating part 10 and a backrest 20, the inclination of which can be adjusted relative to the seating part in the present case. The seating part 10 has a load-bearing seat structure 12, which carries a foam part 300 according to the invention in accordance with a third exemplary embodiment. The foam part 300 is covered by means of a cover 306, preferably produced from a fabric or an animal skin (leather). In FIG. 3, the foam part 300 is concealed by the cover 306 and therefore not visible, which is why the reference sign line of the reference sign of the foam part 300 is dashed.

In terms of its construction and function, the foam part 300 corresponds to the foam parts 100; 200 described above. In particular, the foam part 300 has a corresponding nonwoven layer and a corresponding foam body. The cover 306 can be hung, that is to say fastened, in a manner known per se on the load-bearing seat structure and/or on connecting elements foamed into the foam part. Alternatively or additionally, the cover 306 can be joined to the nonwoven layer at least in places.

Figure 4:
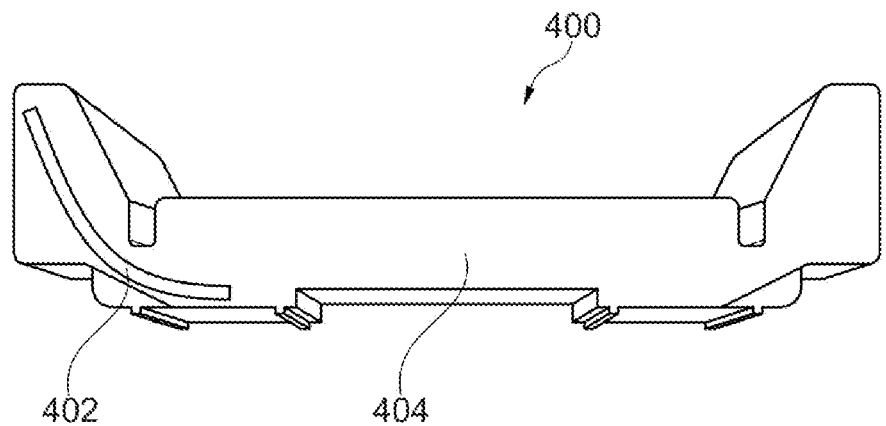
FIG. 4: shows a foam part according to the invention in accordance with a fourth exemplary embodiment.

FIG. 4 shows a foam part 400 according to the invention in accordance with a fourth exemplary embodiment. The foam part 400 has a three-dimensionally shaped nonwoven layer 402 in each of the two outer edge regions of a foam body 404, although only one of the two nonwoven layers 402 is illustrated in FIG. 4. The foam body 404 is foamed three-dimensionally from a foam material, in particular polyurethane foam. The nonwoven layer 402 is three-dimensionally shaped. The foam body 404 is three-dimensionally shaped. The nonwoven layer 402 can be partially or completely penetrated by foam material of the foam body 404. In the present case, the foam part 400 serves as a seat cushion for a seating part of a vehicle seat according to the invention.

Figure 5:
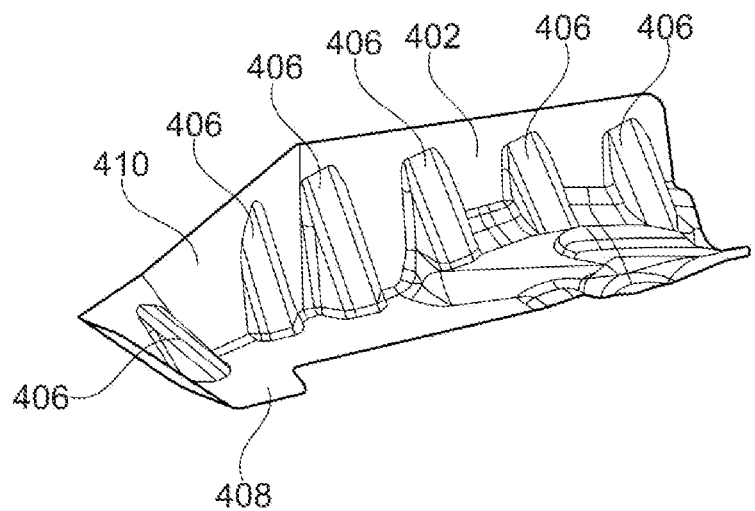
FIG. 5: shows a nonwoven layer of the foam part from FIG. 4, having a plurality of ribs.

FIG. 5 shows a nonwoven layer 402 of the foam part 400. The nonwoven layer 402 is stiffened by ribs 406. In the present case, the nonwoven layer has six ribs 406, which are arranged adjacent to one another and are integrated into the nonwoven layer 402. The nonwoven layer 402 is approximately L-shaped with a first leg 408 and a second leg 410. The two legs 408, 410 are stiffened relative to one another by the ribs 406.

Figure 6:
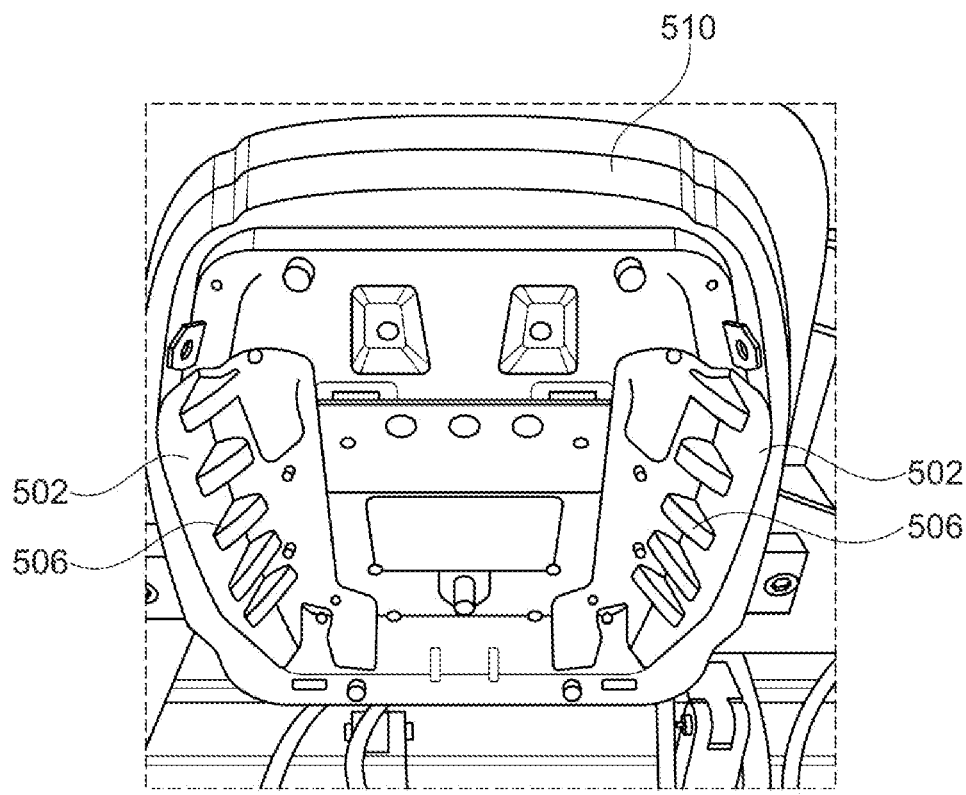
FIG. 6: shows an arrangement of two nonwoven layers of a foam part according to a fifth exemplary embodiment in an opened foaming tool.

FIG. 6 shows an arrangement of two nonwoven layers 502 for a foam part in accordance with a fifth exemplary embodiment in an opened foaming tool 510 for producing the foam part. The two nonwoven layers each have five ribs 506 for stiffening. The ribs 506 are oriented largely parallel to one another and arranged at a distance from one another.

Figure 7:
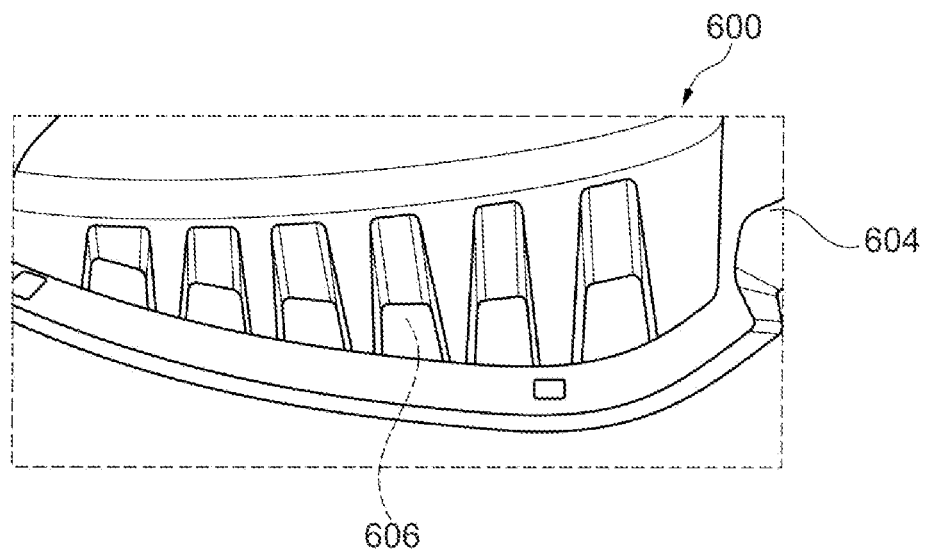
FIG. 7: shows a detail of a foam part in accordance with a sixth exemplary embodiment.

FIG. 7 shows a detail of a foam part 600 according to the invention in accordance with a sixth exemplary embodiment. The foam part 600 has a nonwoven layer with ribs 606, which are completely surrounded by a foam body 604.

A method according to the invention for producing a foam part 100; 200; 300; 400; 600 according to the invention envisages that, in one method step, in particular a first method step, at least one, in particular previously three-dimensionally shaped, nonwoven layer 502 is inserted into a foaming tool 510. In a further method step, in particular a subsequent method step, a foamable material is fed into the foaming tool 510. In a further method step, in particular a subsequent method step, the foamable material in the foaming tool 510 foams to form the foam body 104; 204; 404; 604 and in the process is joined in a positive and/or materially bonded manner to the nonwoven layer 102; 202; 402; 502. In a further method step, in particular a final method step, the foam part 100; 200; 300; 400; 600 is removed from the foaming tool 510.

The features and method steps disclosed in the above description, the claims and the figures may be of importance, both individually and in combination, for the implementation of the invention in its various embodiments.

LIST OF REFERENCE SIGNS 1 vehicle seat
10 seating part
12 load-bearing seat structure
20 seatback
100 foam part
102 nonwoven layer
104 foam body
200 foam part
202 nonwoven layer
204 foam body
300 foam part
306 cover
400 foam part
402 nonwoven layer
404 foam body
406 rib
408 (first) leg
410 (second) leg
502 nonwoven layer
506 rib
510 foaming tool
600 foam part
604 foam body
606 rib

What is claimed:

1. A foam part for a vehicle seat, comprising:
a textile layer, and
a foam body made from polyurethane foam, wherein the textile layer
comprises a three-dimensionally shaped nonwoven layer, wherein the nonwoven layer has a grammage of from 800 to 1200 grams per square meter,
wherein the nonwoven layer is on an underside of the foam body.

2. The foam part as claimed in claim 1, wherein the nonwoven layer has a layer thickness of from 1.3 millimeters to 3.3 millimeters.

3. The foam part as claimed in claim 1, wherein the nonwoven layer has a layer thickness of from 2.3 millimeters to 2.5 millimeters.

4. The foam part as claimed in claim 1, wherein the nonwoven layer has a modulus of elasticity of from 381 megapascals to 850 megapascals.

5. The foam part as claimed in claim 1, wherein the nonwoven layer comprises polypropylene fibers.

6. The foam part as claimed in claim 1, wherein the nonwoven layer consists exclusively of polyester fibers, or the nonwoven layer consists exclusively of polypropylene fibers.

7. The foam part as claimed in claim 1, wherein the nonwoven layer has at least one rib configured to stiffen the nonwoven layer.

8. The foam part as claimed in claim 1, wherein the nonwoven layer has a plurality of ribs.

9. The foam part as claimed in claim 8, wherein the plurality of ribs are adjacent to one another and are integrated into the nonwoven layer.

10. The foam part as claimed in claim 9, wherein the nonwoven layer comprises a first leg and a second leg, wherein the plurality of ribs is connected to both the first leg and the second leg of the nonwoven layer.

11. The foam part as claimed in claim 1, wherein the foam body has a material thickness of from 5 millimeters to 60 millimeters.

12. A method for producing a foam part as claimed in claim 1, having at least the following method steps:
inserting at least one three-dimensionally shaped nonwoven layer into a foaming tool,
feeding a foamable material into the foaming tool, and
removing the foam part from the foaming tool,
wherein the at least one three-dimensionally shaped nonwoven layer is formed by thermoforming.

13. The foam part as claimed in claim 1, wherein the nonwoven layer has a tensile strength of between 8 megapascals and 20 megapascals.

14. The foam part as claimed in claim 13, wherein the nonwoven layer is configured for attachment of (a) a plastic component, (b) a composite component, and/or (c) a metal component.

15. The foam part as claimed in claim 1, wherein the nonwoven layer is configured to stiffen the foam part.

16. The foam part as claimed in claim 1, wherein the nonwoven layer comprises a first nonwoven layer on an underside of a first edge region of the foam body and a second nonwoven layer on an underside of a second edge region of the foam body, wherein the first nonwoven layer comprises a first leg, a second leg and at least one rib configured to stiffen the first leg and the second leg.

17. A vehicle seat having at least one foam part, comprising:
a textile layer embodied as a three-dimensionally shaped nonwoven layer, and
wherein the nonwoven layer has a grammage of from 800 to 1200 grams per square meter, wherein the foam part is made by
thermoforming the textile layer into the three-dimensionally shaped nonwoven layer,
inserting the three-dimensionally shaped nonwoven layer into a foaming tool,
feeding foamable material into the foaming tool, and
removing the foam part from the foaming tool.

18. A foam part for a vehicle seat, comprising:
a textile layer, and
a foam body comprising polyurethane foam,
wherein the textile layer comprises at least one rib configured to stiffen the textile layer.

19. The foam part as claimed in claim 18, wherein the textile layer comprises a first leg and a second leg, wherein the at least one rib is configured to stiffen the first leg and the second leg.

20. The foam part as claimed in claim 18, wherein the textile layer comprises an area weight between 800 and 1200 grams per square meter.

* * * * *